US006489382B1

(12) United States Patent
Giesecke et al.

(10) Patent No.: US 6,489,382 B1
(45) Date of Patent: Dec. 3, 2002

(54) PREPARATIONS OF SOLIDS CONTAINING GRAFT COPOLYMERS

(75) Inventors: Heinz Giesecke, Odenthal (DE); Bernd Hauschel, Leverkusen (DE); Peter-Roger Nyssen, Dormagen (DE); Dirk Pfützenreuter, Burscheid (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/571,054

(22) Filed: May 15, 2000

(30) Foreign Application Priority Data

May 20, 1999 (DE) ........................................ 199 23 073

(51) Int. Cl.[7] ............................ C08K 5/34; C08K 5/42; C08K 5/06

(52) U.S. Cl. ......................... 524/89; 524/100; 524/140; 524/157; 524/158; 524/167; 524/230; 524/248; 524/368

(58) Field of Search .......................... 524/89, 248, 100, 524/140, 157, 158, 167, 230, 368

(56) References Cited

U.S. PATENT DOCUMENTS 4,339,365 A * 7/1982 Becher et al. .............. 523/400
6,077,339 A * 6/2000 Nyssen et al. ........... 106/31.77

* cited by examiner

*Primary Examiner*—Kriellion A. Sanders
(74) *Attorney, Agent, or Firm*—Joseph C. Gil; Thomas W. Roy

(57) ABSTRACT

Preparations of solids comprising a) at least one particulate solid and b) a water-dispersible graft copolymer built up from at least one hydrophobic, ethylenically unsaturated monomer, optionally one or more ethylenically unsaturated hydrophilic monomers, and at least one natural protective colloid or protective colloid obtained from a natural protective colloid by derivatization or thermal, enzymatic, oxidative, hydrolytic or bacteriological degradation having an average molar mass of $M_n$>500 g/mol.

20 Claims, No Drawings

PREPARATIONS OF SOLIDS CONTAINING GRAFT COPOLYMERS

BACKGROUND OF THE INVENTION

The invention relates to preparations of solids containing graft copolymers, to their preparation, and to formulations comprising them and to their use for pigmenting natural and synthetic materials.

Aqueous and non-aqueous coating compositions (emulsion paints, other paints), for example aqueous coating materials for fabric and paper, paper pulp, building materials, especially concrete, plasters, mortar and asphalt, natural and synthetic polymers, and aqueous and non-aqueous inks, especially inkjet inks, are nowadays pigmented using particulate solids, especially organic and inorganic pigments, together with dispersants, in the form of preparations. The function of the dispersants is the physical stabilization of the fine-particled solids (primary particles) in the preparation and/or in the application medium against reaggregation, reagglomeration or flocculation. They further serve for disaggregation and stabilization of the powder pigments or solids, which are generally in the form of aggregates or agglomerates, while the preparations are being prepared, and in particular in connection with the synthesis of organic colour pigments, as auxiliaries for controlling the morphology, crystallization and surface properties.

The dispersants used are generally nonionic, anionic, cationic or amphoteric compounds having molar masses of in general from 500 to 500,000 g/mol. In many cases, ionic dispersants are polyelectrolytes, which are usually used for aqueous applications and which stabilize the fine-particled solids by electrostatic repulsion alone or in conjunction with steric stabilization. Nonionic dispersants stabilize the particles by means of steric effects and are characterized by groups with affinity for the pigment and groups which have affinity or are soluble in the dispersion medium or application medium, e.g. binder. Electrostatic, hydrophobic and hydrogen-bond forces are primarily responsible for the interaction between dispersants and particulate solids.

Ionic dispersants have the disadvantage that their stabilizing action is heavily dependent on the electrolyte concentration of the dispersion medium or application medium.

With many particulate solids, especially organic and inorganic pigments, hydrophobic interactions with the dispersants cannot be utilized to a sufficient extent owing to the predominantly hydrophilic nature of the particle surfaces. In addition to the resultant inadequate stabilization of the particles, the preparations often have further disadvantages, such as increased foaming in conjunction with nonionic wetting agents and/or dispersants and polyelectrolytes, excessive dispersant concentrations, poor product properties such as poor colour yield in the case of organic and inorganic colour pigments, and also incompatibilities in the application media, such as flocculation or even separation of the components.

There is therefore a need for preparations of solids, especially pigment preparations or water-insoluble dye or brightener preparations, having improved properties relative to the prior art.

SUMMARY OF THE INVENTION

Preparations of solids have now been found comprising a) a particulate solid, especially an organic or inorganic pigment, carbon black, extender pigment or metal pigment, water-insoluble or sparingly water-soluble dye or optical brightener and b) a water-dispersible graft copolymer built up from at least one hydrophobic, ethylenically unsaturated monomer, optionally one or more ethylenically unsaturated hydrophilic monomers, and at least one natural protective colloid or protective colloid obtained from a natural protective colloid by derivatization or thermal, enzymatic, oxidative, hydrolytic or bacteriological degradation having an average molar mass of $M_n$>500g/mol.

DETAILED DESCRIPTION OF THE INVENETION

Particulate Solids of Component a)

By particulate solids are meant organic or inorganic solids which are insoluble or sparingly soluble in water and organic solvents, sparing solubility in water meaning a solubility of less than 100 mg/l at 20° C., and which have a primary particle size of less than 100 $\mu$m, in particular less than 10 $\mu$m. They can be polymeric, amorphous or crystalline in nature and may possess lyophilic, lyophobic or amphiphilic properties, in particular lyophilic or amphiphilic, and especially hydrophilic, properties.

For the purposes of the invention they are not subject to any restriction. Particular preference is given to organic and inorganic pigments, water-insoluble dyes and optical brighteners, carbon blacks, and also metal pigments and extender pigments.

Suitable pigments and fillers are those known from the prior art as documented, for example, by Lückert, Pigment+Fullstoff Tabellen, 5th Edition, Laatzen, 1994.

Inorganic white pigments that may be mentioned include especially oxides, such as titanium dioxide, zinc oxide (ZnO, zinc white), zirconium oxide, carbonates such as lead white, for example, sulphates, such as lead sulphate, for example, and sulphites such as zinc sulphite, for example, and lithopones; titanium dioxide is particularly preferred.

Inorganic colour pigments that may be mentioned include those from the group of the oxides and hydroxides in the form of their inorganic single compounds or mixed phases, especially iron oxide pigments, chromium oxide pigments and mixed-phase oxide pigments with a rutile or spinel structure, and also bismuth vanadate, cadmium, cerium sulphide, chromate, ultramarine and iron blue pigments.

Examples of iron oxide pigments are Colour Index Pigment Yellow 42, Pigment Red 101, Pigment Blue 11, Pigment Brown 6, and transparent iron oxide pigments. Examples of chromium oxide pigments are Colour Index Pigment Green 17 and Pigment Green 18. Examples of mixed-phase oxide pigments are nickel titanium yellow and chromium titanium yellow, cobalt green and cobalt blue, zinc iron brown and chromium iron brown, and also iron manganese black and spinel black.

Examples of inorganic black pigments that may be mentioned include those already described above together with the inorganic colour pigments, especially iron oxide black, spinel black, and black mixed-phase oxide pigments.

Furthermore, depending on the field of use, the inorganic pigments may have been organically or inorganically after-treated.

Extenders are, in particular, substances different from the abovementioned pigments, are primarily light in colour, and are inert with respect to the binder of component b). With particular preference, the extenders are distinguished by an optical refractive index which is lower than that of the abovementioned white pigments.

Examples of inorganic extenders that may be mentioned include carbonates, such as chalk, calcite or dolomite, silicon dioxide (quartz flour), natural or synthetic silicas, silicates, such as talc, kaolin or mica, and sulphates such as heavy spar or barium sulphate (blanc fixe).

Examples of organic extenders that may be mentioned are polymeric powders and so-called hollow spheres.

Also suitable are nanoscale pigments of non-oxide ceramics, especially those from the group of the carbides, nitrides, borides and suicides of the elements Ti, Zr, Hf, Si, Ge and Sn having an average primary particle size of from 0.1 to 50 nm.

Suitable organic pigments are, for example, those of the monoazo, disazo, laked azo, β-naphthol, Napthol AS, benzimidazolone, disazo condensation, azo metal complex, azo-methine metal complex, isoindolinone and isoindoline series, and also polycyclic pigments of, for example, the phthalocyanine, quinacridone, perylene, perinone, thioindigo, anthraquinone, dioxazine, quinophthalone and diketopyrrolopyrrole series. Also suitable are laked dyes, such as Ca, Mg and Al lakes of dyes containing sulphonic acid and/or carboxylic acid groups, and also carbon blacks, which for the purposes of this specification are taken to be pigments and of which a large number are known, for example, from the $2^{nd}$ Edition of the Colour Index.

Mention may be made in particular of acidic to alkaline carbon blacks obtained by the gas black or furnace black process, and also chemically surface-modified carbon blacks, examples being sulpho- or carboxyl-containing carbon blacks.

Also suitable are mixed crystallizations (solid solutions) of the abovementioned organic pigments, mixtures of organic and/or inorganic pigments, with inorganic pigments or carbon black, coated metal pigments, mica pigments or talc pigrnents, e.g. mica coated by the CVD process with iron oxide, and also mixtures of the abovementioned pigments with one another.

In one particularly preferred embodiment, component a) comprises at least one pigment of the formula (I) to (III) or tautomeric forms thereof (I)

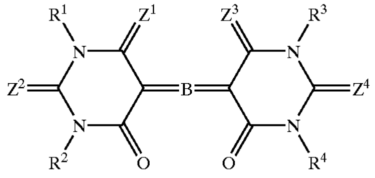

(II)

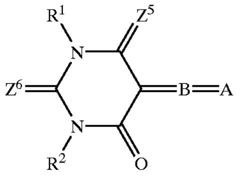

(III)

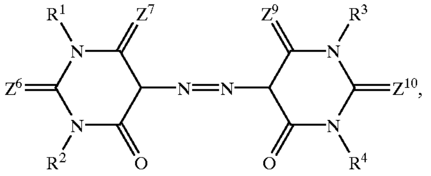

in which $R^1$, $R^2$, $R^3$ and $R^4$ independently of one another represent hydrogen, alkyl, especially $C_1$–$C_6$-alkyl, cycloalkyl, especially $C_5$–$C_8$-cycloalkyl, aryl, especially optionally substituted phenyl, aralkyl, especially $C_6$–$C_{10}$-aryl-$C_1$–$C_4$-alkyl, such as benzyl or ethyl-phenyl, or hetaryl, B denotes the radical of an isoindoline of the formula

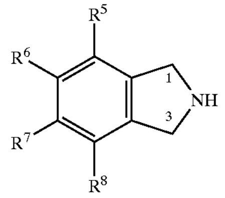

where the linkage with the two double bonds takes place in positions 1 and 3 of the isoindolenine, and $R^5$, $R^6$, $R^7$ and $R^8$ independently of one another represent hydrogen, halogen, especially F, Cl and Br, $C_1$–$C_6$-alkyl, $C_1$–$C_6$-alkoxy or $C_6$–$C_{10}$-aryloxy, A denotes the radical of a cyanomethylene of the formula

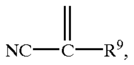

in which $R^9$ represents an electron-withdrawing radical and $Z^1$ to $Z^{10}$ independently of one another represent O or $NR^{10}$, in which $R^{10}$ represents hydrogen or cyano.

The pigments of the formula (I) are known, for example, from DE-A-39 35 858, those of the formula (II), for example, from U.S. Pat. No. 5,177,209 and those of the formula (III), for example, from U.S. Pat. No. 74 515.

Preferred pigments of the formula (I) are symmetrical isoindoline pigments corresponding to the formula (IV)

(IV)

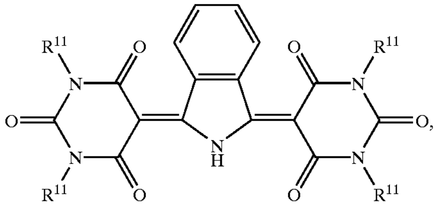

in which $R^{11}$ denotes hydrogen, $C_1$–$C_6$-alkyl or phenyl.

Especially preferred pigments of the formula (I) correspond to the formula (IV) in which $R^{11}$ represents hydrogen.

$R^9$ preferably represents a radical whose Hammett substituent constant (para) is>0. A corresponding list of Hammett substituent constants can be found in, for example, Sykes, Reaktionsmechanismen der organischen Chemie, $9^{th}$ Edition, Weinheim, VCH Verlagsgesellschaft, 1988, or can be determined in accordance with known processes.

Preferred pigments of the formula (II) are asymmetric isoindoline pigments of the formula (V)

(V)

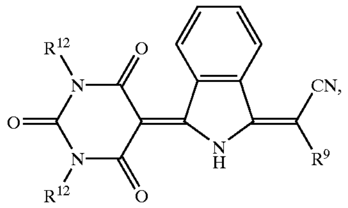

in which $R^9$ denotes CN, aminocarbonyl which is optionally substituted by $C_1$–$C_6$-alkyl, $C_5$–$C_7$-cycloalkyl, aralkyl, especially $C_6$–$C_{10}$-aryl-$C_1$–$C_4$-alkyl, or $C_6$–$C_{10}$-aryl, and especially $CONHCH_3$, or denotes $C_1$–$C_6$-alkoxycarbonyl, $C_6$–$C_{10}$-aryl-oxycarbonyl or hetaryl, especially a radical of the formula (VI) or (VII)

(VI)

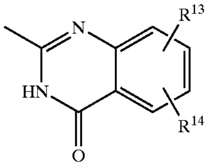

, (VII)

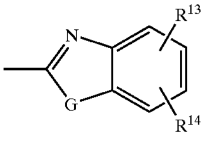

, in which $R^{13}$ and $R^{14}$ independently of one another denote hydrogen, halogen, especially Cl, Br and F, $C_1$–$C_6$-alkyl, $C_1$–$C_6$-alkoxy or $C_1$–$C_6$-alkoxy-carbonyl or $R^{13}$ and $R^{14}$ together denote the radical of a fused-on benzene ring, G represents O, S, NH or N($C_1$–$C_4$-alkyl), and $R^{12}$ denotes hydrogen, $C_1$–$C_6$-alkyl or phenyl.

Especially preferred pigments of the formula (V) are those in which $R^9$ represents $CONHCH_3$ and $R^{12}$ is as defined above, especially those in which $R^9$ represents $CONHCH_3$ and $R^{12}$ represents hydrogen.

Preferred pigments are salts, complexes, inclusion compounds, solid solutions and intercalation compounds of the formula (III). Such pigments are known, for example, from EP-A 74 515. Suitable salts and complexes of the compounds of the formula (III) are preferably the salts and complexes of the mono-, di-, tri- and tetraanions with the metals Li, Cs, Mg, Cd, Co, Al, Cr, Sn, Pb, with particular preference Na, K, Ca, Sr, Ba, Zn, Fe, Ni, Cu, Mn. Particular importance is attached to the nickel salts, and/or nickel complexes and to their solid solutions, intercalation compounds and inclusion compounds. Particular preference is given to an inclusion compound, intercalation compound, solid solution of a salt or of a complex of azobarbituric acid, with particular preference of the 1:1 complex of azobarbituric acid and nickel.

The included compound is preferably a cyclic or acyclic organic compound, preferably carboxamides or sulphonamides, urea or substituted ureas and also heterocycles, especially 2,4,6-triamino-1,3,5-triazine, acetoguanamine and benzo-guanamine.

Particularly preferred pigments of the formula (III) correspond to the formulae (VII) and (IX)

(VIII)

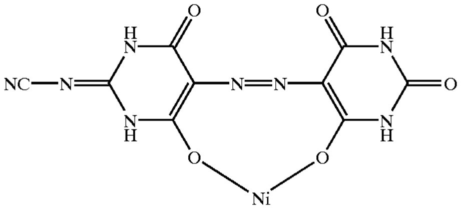

(IX)

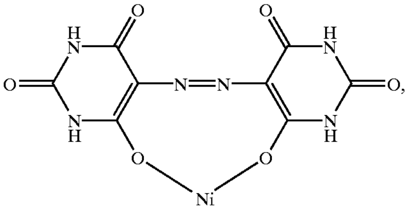

especially in the form of their inclusion compounds or intercalation compounds, the compound included being preferably 2,4,6-triamino-1,3,5-triazine, acetoguanamine or benzoguanamine.

Water-insoluble dyes that may be mentioned include disperse dyes or whiteners (optical brighteners); examples of disperse dyes are those of the azo, disazo, anthraquinone, coumarin, isoindolinone, quinoline and methine series.

Examples of whiteners are those from the series of the correspondingly substituted stilbene, naphthalamide, pyrazoline, heteroarylcoumarin, benzoxazole, benzofuran and pyrene derivatives.

Graft Copolymer of Component b)

The graft polymer of component b) is preferably built up from 1) 90–100% by weight of one or more ethylenically unsaturated, hydrophobic monomers
2) 0–10% by weight of one or more ethylenically unsaturated, hydrophilic monomers
3) 5–300% by weight of at least one natural protective colloid or protective colloid obtained therefrom by derivatization or thermal, enzymatic, bacterio-logical, oxidative or hydrolytic degradation, where Mn is >500 g/mol, the sum of 1) and 2) being 100 % and the amount of 3) being based on this sum.

Suitable monomers specified under 1) are all hydrophobic ethylenically unsaturated monomers such as, for example, styrene, substituted styrenes such as α-methylstyrene or vinyltoluene, acrylic or methacrylic esters of alcohols having 1–18 carbon atoms, such as methyl acrylate, ethyl acrylate, propyl acrylate, n-, iso- or tert-butyl acrylate, hexyl acrylate, ethylhexyl acrylate, stearyl acrylate, and also methyl methacrylate, ethyl methacrylate, propyl methacrylate, n-, iso- or tert-butyl methacrylate, ethylhexyl methacrylate, decyl methacrylate, stearyl methacrylate, etc. Further examples are monomers such as acrylonitrile, methacrylonitrile, butadiene, isoprene, vinyl chloride, vinyl acetate or vinyl propionate.

Suitable hydrophilic monomers specified under 2) are ethylenically unsaturated compounds such as, for example, acrylic acid, methacrylic acid, acrylamide, meth-acrylamide, maleic acid, maleic anhydride, itaconic acid, N-methylolacrylamide, N-methylolmethacrylamide, styrenesulphonic acid, hydroxyethyl acrylate, hydroxyethyl methacrylate, etc. Also suitable are (meth)acrylic acid derivatives and (meth)acrylamide derivatives containing a covalently bonded dialkylamino group. Further suitable compounds are the quatemization products of these (meth) acrylic acid derivatives and (meth)acrylamide derivatives. Examples thereof are dimethylaminoethyl methacrylate, dimethylaminopropylacrylamide, trimethyl-ammonium-propylmethacrylamide chloride, etc. Ethoxylated (meth) acrylates, furthermore, are suitable.

Suitable protective colloids specified under 3) are preferably polyhydroxy compounds such as, for example, starch and starch derivatives, oxidatively, acidically, thermally, bacteriologically or enzymatically degraded starch, cellulose and cellulose derivatives, gelatin, xanthan, hydroxypropylcellulose, carboxymethylcellulose, alginic acid, casein or pectin.

Preference is given to protective colloids having ionic groups, such as anionic or cationic starches, since in that case it is possible for an ionic interaction with the pigment surface to develop. Anionic starch modified with carboxyl groups can be prepared in a simple manner by oxidatively degrading natural starch using sodium hypochlorite; cationic starch is normally prepared by derivatization with 2,3-epoxypropyltrimethyl-ammonium chloride. Phosphate starch or carboxymethyl-cellulose can likewise be used as protective colloids having anionic groups.

As the protective colloid, particular preference is given to the use of starch degraded oxidatively using hypochlorite.

The graft copolymer described under b) is preferably obtainable by polymerizing at least one ethylenically unsaturated hydrophobic monomer and optionally one or more ethylenically unsaturated hydrophilic monomers in emulsion in the presence of at least one natural protective colloid or protective colloid obtained therefrom by derivatization or thermal, enzymatic, bacteriological, oxidative or hydrolytic degradation and having a molar weight Mn of >500 g/mol.

The invention further relates to a process for preparing the preparation of the invention comprising a) and b), which is characterized either in that the two components a) and b) are mixed in water and the mixture of a) and b) is optionally separated off or in that the structural components of b) are emulsion-polymerized in the presence of component a) and the mixture of a) and b) thus prepared is optionally isolated.

The preparation of polymers in the presence of a pigment and of a protective colloid and/or emulsifier is in fact known from EP-A 104 498. It describes, however, the encapsulation of the pigment particles by polymerization of the hydrophobic monomers, the protective colloid and/or emulsifier being used to stabilize the pigments but not serving as a graft base. A nonylphenyl ethoxylate is typically used as the emulsifier. In that case, furthermore, at least a portion of the monomer amount is introduced initially, before the polymerization is initiated, in order to effect the adsorption of the monomers on the particulate solids and hence to achieve maximum encapsulation. In the case of the invention this is unnecessary: the polymer dispersion containing component b) either can be prepared, preferably, in the absence of component a), or component b) is synthesized by the feed technique in the presence of component a), particulate solids and protective colloid being introduced initially in aqueous suspension and the monomers and the free-radical initiator being metered in in parallel.

The patent DE 4 221 381 discloses graft polymers for the purpose of pigment dispersion which are prepared by free-radical graft polymerization of sugars and a mixture of monoethylenically unsaturated monomers containing carboxylic acid groups and containing sulphonic acid groups. This gives strongly anionic and water-soluble graft polymers as dispersants. The graft polymers of the invention, on the other hand, are not soluble in water but are present in the form of sterically stabilized latex particles in water.

EP-A 722 994, furthermore, describes pigmented ink preparations containing graft polymer which are characterized in that the graft polymers contain polyacrylic acid as the graft base onto which hydrophobic side chains have been grafted.

Finally, EP-A 826 751 describes aqueous preparations containing particulate solids and amphiphilic graft polymers as dispersants, both the hydrophobic part and the hydrophilic part of the graft polymer being prepared from ethylenically unsaturated monomers. In the case of the present invention only the hydrophobic graft base is prepared by polymerizing ethylenically unsaturated monomers, whereas the protective colloid c) is already present in oligomeric or polymeric form and constitutes a natural substance or has been obtained from such a substance.

The free-radically initiated polymerization can be conducted discontinuously in a batch technique, semicontinuously in a feed technique, or else continuously in a cascade of stirred vessels or in a flow pipe. In the case of the invention, preference is given to the feed technique.

The polymerization is preferably conducted with substantial exclusion of oxygen. An inert gas atmosphere of nitrogen, for example, is suitable for this purpose.

For the implementation of the batch or feed technique, a stirred vessel is appropriate. In that case it should preferably be ensured that throughout the polymerization there is thorough mixing of the reaction batch with the aid of an appropriate stirrer.

The polymerization is normally conducted at temperatures of 30–100° C., preferably at 70–95° C. Reaction temperatures of more than 100° C. may likewise be employed if reaction is carried out under superatmospheric pressure in a pressure reactor.

The reaction times are preferably between 0.5 and 20 hours, more preferably between 0.75 and 5 hours.

In the case of the batch technique, the particulate solids, the protective colloid, the monomers and the free-radical initiator are preferably introduced initially in the aqueous phase and thoroughly mixed. Emulsifiers as well can optionally be added in order to increase the dispersing effect. The polymerization is started by heating the reaction mixture to an appropriate temperature, as a result of which the rate of decomposition of the respective initiator generally becomes so great that the polymerization remains ongoing. The temperature is normally held at this level until conversion of the monomers is virtually complete.

In the case of the feed technique, the free-radical initiator and the monomers—individually or as a mixture—are preferably metered at a uniform rate into the aqueous suspension containing the particulate solids and the protective colloid. Also possible is the staggered or non-uniform addition of the individual components to be added. Again, emulsifiers can optionally be added in order to increase the dispersing effect.

Examples of suitable emulsifiers are anionic or nonionic emulsifiers of low molecular mass such as sodium alkyl sulphates and sodium alkylsulphonates, sodium alkylbenzenesulphonates, sulphosuccinic esters, fatty alcohol polyglycol ethers, alkylaryl polyglycol ethers, etc. Also suitable are polymeric anionic emulsifiers based on maleic anhydride copolymers or based on oligourethanes, as are described, for example, in the European patent applications EP-A 331 066 and EP-A 400 410.

Suitable initiators are grafting-active water-soluble redox systems. Less suitable are water-insoluble initiators or sparingly water-soluble initiators based on organic peroxides or organic azo compounds.

Water-soluble redox systems which can be used are, for example, conventional initiators such as potassium peroxodisulphate, ammonium peroxodisulphate or hydrogen peroxide in combination with reducing agents such as sodium sulphite, sodium bisulphite, sodium dithionite, ascorbic acid or sodium hydroxymethane-sulphinate. Further suitable redox systems are those of hydrogen peroxide and heavy metal salts, as are described, for example, in Houben-Weyl: Methoden der Organischen Chemie, $4^{th}$ Edition, Volume E 20, p. 2168. Examples of suitable heavy metals are cerium, iron and manganese. Preference is given to these redox systems containing metal ions, particular preference to the redox system composed of hydrogen peroxide and an iron(II) salt such as iron(II) sulphate or iron ammonium sulphate.

The use of the hydrogen peroxide/heavy metal salt combination ensures particularly effective grafting of the vinyl monomers onto the protective colloid. The graft yield is that portion of the polymer which is attached chemically to the protective colloid at the end of polymerization. In order to avoid a premature redox reaction, the heavy metal salt and the hydrogen peroxide are added separately. The heavy metal salt is usually added to the batch before the beginning of polymerization, while the hydrogen peroxide, in the case of the preferred feed technique, is metered in in parallel with the monomers. Owing to its catalytic action, the heavy metal salt can be used in very small amounts: concentrations of 10–300 mg of metal cation/kg are normal, although the use of higher or lower amounts is not ruled out. Hydrogen peroxide (calculated as 100% product) is used preferably in concentrations of 0.2–5.0% by weight (based on the overall amount of monomers).

Also possible is the concomitant use of the first-mentioned free-radical initiator, the addition of a reducing agent offering advantages in particular when the heavy metal salt/hydrogen peroxide system is used. The reducing agent can either be metered in in parallel to monomer mixture and hydrogen peroxide or can be introduced initially together with the heavy metal salt.

A further option is the concomitant use of chain transfer agents or regulators, which generally reduces the average molecular weight of the polymer chains grafted on. Examples of suitable chain transfer agents are ethyl mercaptan, n-butyl mercaptan, tert-butyl mercaptan, n-dodecyl mercaptan, tert-dodecyl mercaptan, etc.

When using the initiator system comprising hydrogen peroxide and heavy metal salt, the polymerization normally comes to a standstill at monomer conversions of 95–98%. However, it is possible to reduce substantially this relatively high residual monomer content by adding a lipophilic free-radical initiator of sparing solubility in water. Suitable for this purpose are common organic peroxides such as tert-butyl hydroperoxide, di-tert-butyl peroxide, dibenzoyl peroxide or cumene hydroperoxide.

In order to obtain suspensions having a low residual monomer content, polymerization is carried out first using the redox system comprising heavy metal cation and hydrogen peroxide and, after all of the hydrogen peroxide has decomposed, an organic peroxide of sparing solubility in water, for example, is added. The organic peroxides of sparing solubility in water are characterized in that their solubility in water at room temperature is less than 1%.

The polymerization is conducted at a pH of 2–9, preferably within the weakly acidic range at a pH of 2.5–6. The pH can be adjusted to the desired level before or during the polymerization using customary acids and bases, respectively, such as hydrochloric acid, sulphuric acid, acetic acid, sodium hydroxide solution, potassium hydroxide solution, ammonia, etc. Also possible is adjustment with common acids or bases, respectively, after the end of the polymerization.

The preparations of solids of the invention, comprising components a) and b), are outstandingly suitable for dispersing and pigmenting in a large number of aqueous and non-aqueous dispersion media and application media. In particular they are suitable for pigmenting hydrophobic media and in comparison to the solids of component a) alone possess increased stability in non-polar organic media and, in conjunction with any dispersants used, in polar organic and aqueous media.

The invention additionally provides formulations further comprising in addition to components a) and b)

c) at least one dispersant and d) optionally an aqueous and/or organic medium.

Dispersants of Component c)

The dispersants of component c) to be used in the formulations of the invention comprising the preparations of solids containing component a) and b) can be nonionic, anionic, cationic or amphoteric surface-active compounds.

For the purposes of the invention they are not subject in principle to any restriction. Depending on the use of the preparations of solids and their formulations, suitable compounds c) are available to the person skilled in the art and can be found; for example, in "Surfactants Europa" 3rd Edition, edited by Gordon L. Hollis, 1995.

Generally, in formations containing water as additional component d) or in formulations used in aqueous or aqueous-organic medium, both ionic and nonionic dispersants are used which possess at least one anchor group having a high adsorption capacity and affinity for the preparations of solids, and alternatively ionic groups for electrostatic stabilization, hydrophilic or water-soluble groups for steric stabilization, or both, such as polyfunctional dispersants, for example.

The dispersants possess, in particular, molecules having a molar mass of >500 to 500,000 g/mol, especially >1000 to 100,000 g/mol.

Preferred dispersants of component c) are compounds from the group of the phenol/styrene polyglycol ethers and/or ionically modified polyglycol ethers.

Preferred phenol/styrene polyglycol ethers and ionically modified polyglycol ethers have an HLB of from 10 to 20, in particular from 12 to 18.

Preferred alkoxylation products of styrene-phenol condensates are those of the formula (X)

(X)

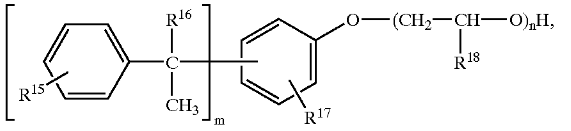

in which $R^{15}$ denotes hydrogen or $C_1$–$C_4$-alkyl, $R^{16}$ represents hydrogen or $CH_3$, $R^{17}$ denotes hydrogen, $C_1$–$C_4$-alkyl, $C_1$–$C_4$-alkoxy, $C_1$–$C_4$-alkoxycarbonyl or phenyl, m denotes a number from 1 to 4, n denotes a number from 6 to 120, $R^{18}$ is identical or different for each unit indicated by n and represents hydrogen, $CH_3$ or phenyl, $R^{18}$ representing $CH_3$ in from 0 to 60% of the overall value of n when $CH_3$ is present in the various —(—$CH_2$—CH($R^{18}$)—O—)— groups and $R^{18}$ representing hydrogen in from 100 to 40% of the overall value of n, and $R^{18}$ representing phenyl in from 0 to 40% of the overall value of n where phenyl is present in the various —(—$CH_2$—CH($R^{18}$)—O—)— groups and $R^{18}$ representing hydrogen in from 100 to 60% of the overall value of n.

Preferred ionically modified alkoxylation products (X) are those of the formula (XI)

(XI)

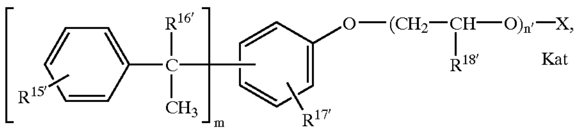

in which $R^{15'}$, $R^{16'}$, $R^{17'}$, $R^{18'}$, m' and n' adopt the scope of definition of $R^{15}$, $R^{16}$, $R^{17}$, $R^{18}$, m and n, respectively but independently therefrom, X denotes the group —$SO_3^{\ominus}$, —$SO_2^{\ominus}$, —$PO_3^{\ominus\ominus}$ or —CO—($R^{19}$)—$COO^{\ominus}$, Kat is a cation from the group $H^{\oplus}$, $Li^{\oplus}$, $Na^{\oplus}$, $K^{\oplus}$, $NH_4^{\oplus}$ or —HO—$CH_2CH_2$—$NH_4^{\oplus}$, and if X=—$PO_3^{\ominus\ominus}$ there are two Kat cations, and $R^{19}$ represents a divalent aliphatic or aromatic radical, preferably $C_1$–$C_4$-alkylene, especially ethylene, $C_2$–$C_4$ monounsaturated radicals, especially acetylene, or optionally substituted phenylene, especially ortho-phenylene, possible substituents being preferably $C_1$–$C_4$-alkyl, $C_1$–$C_4$-alkoxy, $C_1$–$C_4$-alkoxycarbonyl or phenyl.

Particular preference is also given to mixtures of these condensates of the formulae (X) and (XI).

A further dispersant of component c) that may be mentioned is a dispersant of component c1), a condensation product based on A) sulphonated aromatics, B) aldehydes and/or ketones and optionally C) one or more compounds selected from the group of unsulphonated aromatics, urea and urea derivatives.

"Based on" means that the condensation product may have been prepared from further reactants in addition to A, B and optionally C. Preferably, however, for the purposes of this specification the condensation products are prepared only from A, B and optionally C.

For the purposes of this specification, sulphonated aromatics of component a) include sulphomethylated aromatics. Preferred sulphonated aromatics are the following: naphthalenesulphonic acids, phenolsulphonic acids, dihydroxybenzenesulphonic acids, sulphonated ditolyl ethers, sulphomethylated 4,4'-dihydroxydiphenyl sulphone, sulphonated diphenylmethane, sulphonated biphenyl, sulphonated hydroxybiphenyl, especially 2-hydroxybiphenyl, sulphonated terphenyl or benzenesulphonic acids.

Particularly suitable aldehydes and/or ketones of component B) are aliphatic, cycloaliphatic and aromatic representatives. Preference is given to aliphatic aldehydes, particular preference being given to formaldehyde and to other aliphatic aldehydes having 3 to 5 carbon atoms.

Examples of suitable unsulphonated aromatics of component C) are phenol, cresol, 4,4'-dihydroxydiphenyl sulphone or dihydroxydiphenylmethane.

Examples that may be mentioned of urea derivatives include dimethylolurea, melamine and guanidine.

A preferred condensation product of component c1) is one based on

A) at least one sulphonated aromatic selected from the group of naphthalene-sulphonic acids, phenolsulphonic acids, dihydroxybenzenesulphonic acids, sulphonated ditolyl ethers, sulphomethylated 4,4'-dihydroxydiphenyl sulphone, sulphonated diphenylmethane, sulphonated biphenyl, sulphonated hydroxybiphenyl, especially 2-hydroxybiphenyl, sulphonated terphenyl and benzenesulphonic acids, B) formaldehyde and optionally C) one or more compounds selected from the group of phenol, cresol, 4,4'-dihydroxydiphenyl sulphone, dihydroxydiphenyl methane, urea, dimethylolurea, melamine and guanidine.

The condensation product obtained preferably in the condensation preferably possesses an average degree of condensation of from 1 to 150, with particular preference from 1 to 20, in particular from 1 to 5.

The condensation products of component c1) can be used in the form of an aqueous solution or suspension or as a solid, for example as powder or granules, preferably as spray-dried powder or granules.

Preferred condensation products of component c1) have an inorganic salt content of less than 10% by weight, preferably less than 5% by weight, in particular less than 1% by weight, based on the aqueous solution or suspension of the component that is used or based on the solid of component c1) that is used.

It is likewise preferred to use condensation products of the component c1) that are low in residual monomer or free from residual monomer.

"Low in monomer" refers to a residual monomer content of less than 30% by weight, preferably less than 20% by weight, based on the condensation product, in particular <10% by weight, preferably <5% by weight. Residual monomers in this context are the reactants used to prepare the condensation product.

Low-salt condensation products of this kind which are low in residual monomer are known, for example, from EP-A 816 406.

The condensation products of components c1) can be prepared, for example, by first preparing the sulphonated aromatics of component A) optionally in a mixture with unsulphonated aromatics of component C) by reacting the parent aromatics with a sulphonating agent, preferably sulphuric acid, especially concentrated sulphuric acid, chlorosulphonic acid, amidosulphonic acid or oleum.

It is preferred to use from 0.4 to 3.2 mol, in particular from 0.8 to 1.6 mol, of sulphonating agent per mole of the aromatic on which component A) is based.

This is followed by the condensation with aldehydes and/or ketones of component B), preferably formaldehyde, optionally together with further compounds of component C). The condensation takes place preferably in aqueous solution at a pH of from 0 to 9. In this case it is preferred to use from 0.4 to 1.5 mol, in particular from 0.4 to 1.0 mol, of component B) per mole of the sulphonated aromatic A) or per mole of a mixture of sulphonated aromatics of component A) and unsulphonated aromatics of component C).

This is followed optionally by the neutralization of the sulphonate condensation product of component c1) with a base.

The separation of the inorganic acid or its salts and the reduction in the residual monomer content can be implementing using, for example, membrane separation techniques. Preferred membrane separation techniques in this context are ultrafiltration, diffusion dialysis or electrodialysis.

The membranes used in the membrane separation techniques, preferably in the ultrafiltration, in one preferred embodiment possess a molecular weight cutoff (MWCO) of from 1000 to 10,000 daltons.

The separation of the inorganic acid with the aid of a membrane separation technique takes place preferably by the method of diafiltration with acid-stable ultrafiltration or nanofiltration membranes in cross-flow filtration mode. Examples of suitable membranes in this case are polyhydantoin membranes, as known from EP-A 652 044.

Preferred membranes for this purpose possess an MWCO level of from 2000 to 10,000 daltons. Optionally, concentration takes place simultaneously with this process step.

A further dispersant is a dispersant of component c2)

c2) being a compound from the group of phosphoric acid, phosphonic acid and/or derivatives thereof.

Compounds of group c2) embrace phosphoric acid derivatives, phosphonic acid derivatives such as, for example, the reaction products of phosphoric acid or phosphonic acid with polyols and/or monoalcohols.

Phosphoric acid derivatives are preferably phosphoric monoesters and diesters of the general formula (XIII)

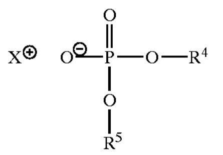

or (XIV)

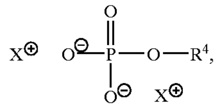

where $R^4$ and $R^5$ independently denote an organic radical having 1–20 carbon atoms and $X^{\oplus}$ represents H, or a monovalent cation.

Preferred compounds of the formula (XIII) or (XIV) are the alkali metal salts of phosphoric diesters having $C_6$–$C_{10}$ aliphatic radicals, especially sodium dioctyl phosphate.

Phosphonic acid derivatives are preferably compounds of the general formula (XV)

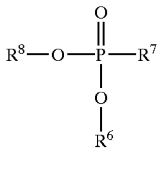

in which $R^6$ represents H, or an organic radical having 1–20 carbon atoms, $R^7$ denotes $C_{11}$–$C_{22}$-alkyl or cycloalkyl, $C_7$–$C_{18}$-aralkyl, or a radical of the general formula $$—R^9—O—CO—R^{10}$$

or $$—R^9—COO—R^{10},$$

where $R^9$ denotes an optionally substituted $C_2$–$C_4$-alkylene radical, and $R^{10}$ denotes a $C_6$–$C_{22}$-alkyl, cycloalkyl or alkylene radical;

in particular, $R^7$ may be a radical of $C_4$–$C_7$-dicarboxylic or tricarboxylic acid or derivatives thereof (e.g. esters), for example the radical of butane-1,2,4-tricarboxylic acid, ethanedicarboxylic acid or derivatives thereof. (Compounds of this kind of the formula (XV) can be obtained, for example, by subjecting phosphites to addition reaction with unsaturated dicarboxylic or tricarboxylic acid (or derivatives thereof).)

$R^8$ represents H or $CH_3$.

Preferred compounds are phosphonosuccinic acid or phosphono-1,2,4-tricarboxylic acid.

The derivatives can be used in particular in the form in which they are neutralized with monofunctional bases.

Reaction products of the said compounds are obtained by reacting phosphonic acid derivatives, examples being their esters based on low-boiling alcohols, with polyols and/or alcohols. Suitable polyols are polyethylene glycols and/or polypropylene glycols having 2–50 molar units, especially 5–20 molar units, of alkylene oxide.

Suitable alcohols are straight-chain, branched or cycloaliphatic $C_6$–$C_{22}$ alcohols or mixtures thereof, preferably fatty alcohols.

With particular preference, the reaction products correspond to the general formula

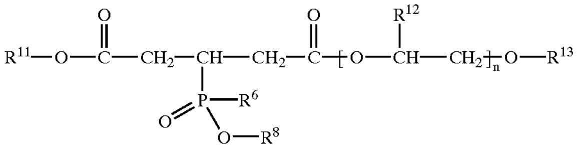

where $R^6$, $R^8$ are as defined above, $R^{11}$ is $C_6$–$C_{22}$-alcohol, preferably aliphatic or cycloaliphatic alcohols, especially fatty alcohols, n is 1–10, $R^{12}$ is H, $CH_3$, $R^{13}$ is H, $CH_3$.

The reaction products can optionally be used in the form in which they are neutralized with monofunctional bases.

The pigment preparations of the invention may comprise as additional dispersants of component c) those, for example, which are specified below.

c3) Oxalkylation products obtainable by condensing aromatics containing phenolic OH groups with formaldehyde and NH-functional groups, examples being those from the group of the novolaks or alkylaryl polyglycol ethers.

Preference is given to oxalkylation products of this kind obtainable by condensing aromatics having phenolic OH groups with formaldehyde and amines containing a formaldehyde-reactive NH group, or derivatives of such oxalkylation products. Preference is given to those obtained by oxalkylating compounds of the formula (XVI)

(XVI)

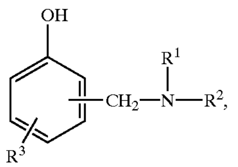

in which $R^1$ denotes the monovalent radical of an optionally substituted aliphatic, cycloaliphatic or aromatic hydrocarbon, $R^2$ denotes hydrogen or the monovalent radical of an optionally substituted aliphatic, cycloaliphatic or aromatic hydrocarbon and $R^3$ denotes hydrogen, $C_1$–$C_{20}$-alkyl, $C_5$–$C_7$-cycloalkyl, phenyl, benzyl, halogen, hydroxyl, $C_1$–$C_{18}$-alkoxy, carboxyl or $C_1$–$C_{18}$-alkoxycarbonyl, the oxalkylation reagents used being preferably ethylene oxide, propylene oxide, butylene oxide, styrene oxide, glycide or mixtures of these compounds, but especially ethylene oxide, optionally together with propylene oxide. Oxalkylation products of this kind are described, for example, in DE 27 11 240.

c4) Water-soluble polyisocyanate adducts containing hydrophilic polyether chains containing preferably not more than 1.0% by weight of isocyanate groups, 30–99.5% by weight of ethylene oxide units arranged within polyether chains and incorporated by way of monofunctional alcohols, and having an ionic group content of 0–200 milliequivalents/100 g of polyisocyanate adduct.

Dispersants of this kind are disclosed, for example, in DE-A 1 963 382.

Preferred polyisocyanate adducts of component c4) are prepared, for example, while observing an NCO index of from 100 to 130, by reacting A) a polyisocyanate component having an average NCO functionality of from 3.0 to 6 and an NCO content of from 7 to 30% by weight, consisting of isocyanurate-group-containing modification products of 2,4-diisocyanatotoluene or its mixtures with up to 35% by weight, based on the mixture, of 2,4-diisocyanatotoluene, with B) from 50 to 90 equivalent-%, based on component A), of a monovalent alcohol component consisting of at least one monovalent polyether alcohol from the molecular weight range from 150 to 10,000, preferably from 150 to 5000 g/mol, having an ethylene oxide unit content of from 40 to 99.5% by weight, and prepared by alkoxylating a monovalent starter molecule, C) from 0 to 20 equivalent-%, based on the isocyanate groups of A), of a monovalent compound containing isocyanate-reactive groups, from the molecular weight range from 32 to 5000 g/mol, which additionally contains ionic groups, and D) from 10 to 50 equivalent-%, based on component A), of an amine component consisting of at least one tertiary amine from the molecular weight range from 88 to 250 g/mol having a group which is reactive towards isocyanate groups in the sense of the NCO addition reaction, with urethane formation and optionally secondary reactions, carried out simultaneously with or subsequent to the urethane formation, to reduce the level of any excess NCO groups present to a residual content of not more than 1.0% by weight, the nature and proportions of the starting components being chosen such that the reaction product contains from 40 to 75% by weight of ethylene oxide units incorporated by way of component B).

Likewise preferred polyisocyanate adducts of component c4) are prepared, for example, while observing an NCO index of from 131 to 600, by reacting A) a polyisocyanate component having an average NCO functionality of from 1.7 to 2.5 and an NCO content of from 30 to 65% by weight, consisting of at least one isocyanate from the following group: 2,4-diisocyanatotoluene, 2,6-diisocyanatotoluene, 4,4'-diisocyanato-diphenylmethane, 2,4'-diisocyanato-diphenylmethane, with B) from 5 to 50 equivalent-%, based on component A), of an alcohol component consisting of the type specified above under B), C) from 0 to 10 equivalent-%, based on the isocyanate groups of A), of a monovalent compound containing isocyanate-reactive groups, from the molecular weight range from 32 to 5000 g/mol, which additionally contains ionic groups, and D) from 0 to 20 equivalent-%, based on component A), of an amine component of the type specified above under D), with urethane formation and optionally secondary reactions, carried out simultaneously with or subsequent to the urethane formation, to reduce the level of any excess NCO groups present to a residual content of not more than 1.0% by weight, the nature and proportions of the starting components being chosen such that the reaction product contains from 40 to 75% by weight of ethylene oxide units incorporated by way of component B).

With particular preference, the abovementioned pigment preparations of the invention contain as dispersant of component c4) a polyisocyanate adduct containing from 10 to 50 milliequivalents of ionic groups per 100 g of component c4).

c5) Water-soluble inorganic salts, especially borates, carbonates, silicates, sulphates, sulphites, selenates, chlorides, fluorides, phosphates, nitrates and aluminates of the alkali metals and alkaline earth metals and of other metals, and also ammonium;

Compounds from the group of the water-soluble salts are used preferably for preparing the preparations of the invention based on inorganic pigments or extenders (component a).

Compounds of this group are generally used together with another of the abovementioned compounds of component c). The amount of the compounds of the group mentioned, based on pigment, is from 0.01 to 10% by weight, preferably from 0.2 to 4% by weight.

Particular preference is given to magnesium sulphate.

c6) Polymers composed of repeating succinyl units, especially polyaspartic acid

In one preferred embodiment the polymers of component c6) have repeating succinyl units comprising one of the following structures:

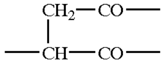

preferably

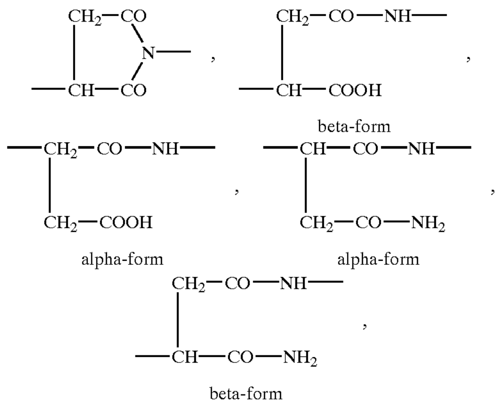

beta-form alpha-form alpha-form beta-form which structures may optionally be present in salt form as well.

By α- and β-form is meant in each case the peptide linkages obtained as a result of the carboxyl groups in α or β position, respectively.

In addition, further repeating units may be present as a result of appropriate reaction regime and choice of starting materials, examples of these units being a) malic acid units of the formula

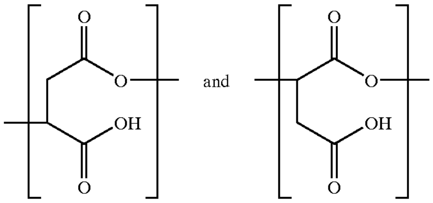

and b) maleic and fumaric acid units of the formula

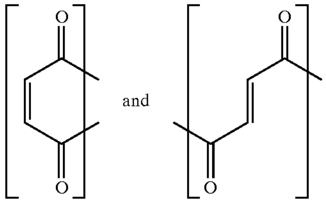

and c) iminodisuccinate units of the formula

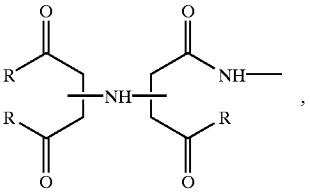

-continued

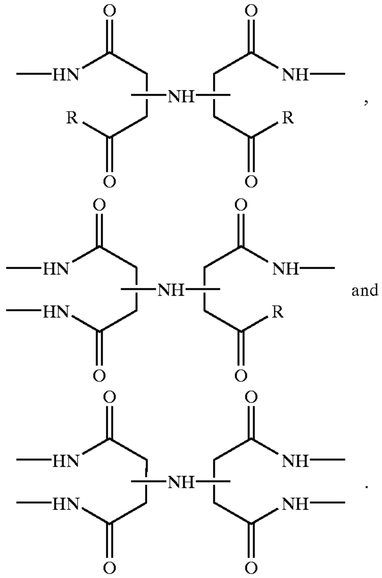

and

R = OH, $O^-NH_4^+$, $NH_2$

The chemical structure is analyzed preferably by $^{13}C$-NMR, FT-IR and, following total hydrolysis, by HPLC, GC and GC/MS.

Many production processes initially produce not the pure acids but rather the corresponding anhydrides, an example being polysuccinimide (PSI). Polymerization products of this kind can be converted to a salt by reaction with a base, optionally in the presence of water. This conversion takes place subsequently in an appropriate apparatus by means of hydrolysis. Preference is given here to a pH of between 5 and 14. In a particularly preferred form a pH of from 7 to 12 is chosen, achieved in particular through the addition of a base. Suitable bases are alkali metal hydroxides and alkaline earth metal hydroxides or carbonates such as, for example, sodium hydroxide solution, potassium hydroxide solution, sodium carbonate or potassium carbonate, ammonia and amines such as triethylamine, triethanolamine, diethylamine, diethanolamine, alkylamines, etc.

In addition to free acids, particular preference is given to their Na, K or Ca salts.

The temperature during hydrolysis is suitably within a range up to and including the boiling point of the PSI suspension and is preferably from 20 to 150° C. The hydrolysis is optionally carried out under pressure.

It is, however, also possible to obtain the free acid, especially polyaspartic acid, by purely aqueous hydrolysis or by treatment of the salt with acids or with acidic ion exchangers. For the purposes of the present invention, the term “polyaspartic acid” (=PAS) likewise includes the salts, unless expressly stated otherwise.

The polymers of component c6) can be used in the form of an aqueous solution or suspension, or as a solid, and as powder or granules, preferably as spray-dried powder or granules.

Preferred polymers have a molecular weight, according to analyses by gel permeation chromatography, of Mw=500 to 10,000, preferably 70 to 5000, with particular preference 1000 to 4500. In general, the proportion of the beta-form is more than 50%, preferably more than 70%.

The crude polymers can be freed from monomeric fractions by customary methods of working up, for example by extraction with water and 1 N hydrochloric acid, or by membrane separation techniques. Suitable membrane separation techniques were described earlier in connection with component c1).

The preparation of the polymers of component c6) having repeating succinyl units, especially of α/β-polyaspartic acids and polysuccinimides, is known per se; see U.S. Pat. No. 4,839,461 (=EP-A 0 256 366).

Moreover, further additional dispersants of group c7) can be used in the pigment preparations of the invention and are advantageous for the dispersion of the pigments in the course of the preparation processes.

These dispersants can be nonionic, anionic, cationic or amphoteric compounds. Examples of nonionic dispersants of c7) are the following: alkoxylates, alkylolamides, esters, amine oxides and alkyl polyglycosides.

Further suitable nonionic dispersants are the following: reaction products of alkylene oxides with alkylatable compounds, such as fatty alcohols, fatty amines, fatty acids, phenols, alkylphenols, carboxamides and resin acids, for example. These dispersants are, for example, ethylene oxide adducts from the class of the reaction products of ethylene oxide with:

a) saturated and/or unsaturated fatty alcohols having 6 to 20 carbon atoms or b) alkylphenols having 4 to 12 carbon atoms in the alkyl radical or c) saturated and/or unsaturated fatty amines having 14 to 20 carbon atoms or d) saturated and/or unsaturated fatty acids having 14 to 20 carbon atoms or e) hydrogenated and/or unhydrogenated resin acids, f) esterification products and/or arylation products prepared from natural or modified, optionally hydrogenated castor oil fatty substances, the products being optionally linked by esterification with dicarboxylic acids to form repeating structural units.

Particularly suitable ethylene oxide adducts are the alkylatable compounds specified under a) to e) with from 5 to 120, preferably from 5 to 60, in particular from 5 to 30, mol of ethylene oxide.

Examples of polymeric dispersants are the compounds listed in the index "Water-Soluble Synthetic Polymers: Properties and Behavior" (Volumes I to II by Philip Molyneux, CRC Press, Florida 1983/84).

Particular preference is given to nonionic polymeric dispersants.

Examples of suitable polymeric dispersants are water-soluble and water-emulsifiable compounds having an average molecular weight of 1000–100,000 g/mol, preferably 2000–40,000 and, in particular, from 2000 to 30,000 g/mol, examples being homopolymers and copolymers, graft polymers and graft copolymers, and also random block copolymers.

Examples of particularly preferred polymeric dispersants are AB, BAB and ABC block copolymers. In the AB or BAB block copolymers, the A segment is a hydrophobic homopolymer or copolymer which ensures a connection to the pigment and the B block is a hydrophilic homopolymer or copolymer or a salt thereof and ensures the dispersing of the pigment in the aqueous medium. Polymeric dispersants of this kind and their synthesis are known, for example, from EP-A-518 225 and EP-A-556 649.

Further examples of suitable polymeric dispersants are polyethylene oxides, polypropylene oxides, polyoxymethylenes, polytrimethylene oxides, polyvinyl methyl ethers, polyethyleneimines, polyacrylic acids, polyarylamides, polymethacrylic acids, polymethacrylamides, poly-N,N-dimethyl-acrylamides, poly-N-isopropylacrylamides, poly-N-acryloylglycinamides, poly-N-methacryloylglycinamides, polyvinyloxazolidones, polyvinylmethyloxazolidones.

Examples of anionic dispersants are the following: alkyl sulphates, ether sulphates, ether carboxylates, phosphate esters, sulphosuccinate amides, paraffin sulphonates, olefin sulphonates, sarcosinates, isothionates and taurates.

Particular preference is given to anionic polymeric dispersants.

Suitable anionic polymeric dispersants are, in particular, condensation products of aromatic sulphonic acids with formaldehyde, such as condensation products of formaldehyde and alkylnaphthalenesulphonic acids or of formaldehyde, naphthalenesulphonic acids and/or benzenesulphonic acids, and condensation products of optionally substituted phenol with formaldehyde and sodium bisulphite.

Also suitable are condensation products obtainable by reacting naphthols with alkanols, subjecting the product to addition reaction with alkylene oxide, and converting at least some of the terminal hydroxyl groups into sulpho groups or monoesters of maleic acid, phthalic acid or succinic acid.

Also suitable, moreover, are dispersants from the group of the sulphosuccinic esters, and also alkylbenzenesulphonates, as are ionically modified, alkoxylated fatty acid alcohols or salts thereof. Alkoxylated fatty acid alcohols are in particular saturated or unsaturated $C_6$–$C_{22}$ fatty acid alcohols, especially stearyl alcohol, which have been provided with from 5 to 120, preferably from 5 to 60 and, in particular, from 5 to 30 ethylene oxide units. Particular preference is given to a stearyl alcohol alkoxylated with from 8 to 10 ethylene oxide units. The ionically modified alkoxylated fatty acid alcohols are preferably in salt form, especially as alkali metal salts or amine salts, preferably as the diethylamine salt. Ionic modification is, for example, sulphating, carboxylating or phosphating.

Further examples of anionic polymeric dispersants are the salts of polyacrylic acids, polyethylenesulphonic acids, polystyrenesulphonic acid, polymethacrylic acids and polyphosphoric acids.

Additional examples of anionic polymeric dispersants are copolymers of acrylic monomers, which are indicated by way of example in the following table by a combination of the following monomers and which are synthesized to random, alternating or graft copolymers:

acrylamide, acrylic acid;
acrylamide, acrylonitrile;
acrylic acid, N-acryloylglycinamide;
acrylic acid, ethyl acrylate;
acrylic acid, methyl acrylate;
acrylic acid, methylenebutyrolactam;
N-acryloylglycinamide, N-isopropylacrylamide;
methacrylamide, methacrylic acid;
methacrylic acid, benzyl methacrylate;
methacrylic acid, diphenylmethyl methacrylate;
methacrylic acid, methyl methacrylate;
methacrylic acid, styrene.

Further anionic polymeric dispersants are styrene-maleic anhydride copolymers, copolymers thereof with the above-mentioned acrylic monomers, and also polyurethane-based polymers.

Also suitable are lignin-based compounds, especially lignin sulphonates, e.g. those obtained by the sulphite or kraft process. They are preferably products which in part are hydrolysed, oxidized, propoxylated, sulphonated, sulphomethylated or di-sulphonated and fractionated by known processes, for example in accordance with the molecular weight or in accordance with the degree of sulphonation. Mixtures of sulphite and kraft ligninsulphonates are also highly effective. Particularly suitable ligninsulphonates are those having an average molecular weight of more than 1000 to 100,000, an active ligninsulphonate content of at least 80% by weight and, preferably, a low polyvalent cation content. The degree of sulphonation can vary within wide limits.

Examples of cationic dispersants are as follows: quaternary alkylammonium compounds and imidazoles.

Particular preference is given to cationic polymeric dispersants.

Examples of cationic polymeric dispersants are the salts of polyethyleneimines, polyvinylamines, poly(2-vinylpyridines), poly(4-vinylpyridines), poly(diallyldimethylammonium) chloride, poly(4-vinylbenzyltrimethylammonium) salts and poly(2-vinylpiperidine).

Preferred cationic polymeric dispersants contain neutralized tertiary amino groups and/or quaternary ammonium groups. Particularly preferred compounds are described in Le A 28 798.

Examples of amphoteric dispersants are the following compounds: betaines, glycinates, propionates and imidazolines.

Anionic and cationic polymers are summarized as polyelectrolytes and are fully or partly dissociable in an aqueous and/or organic phase.

Where the formulations contain as additional component d) an organic medium or non-aqueous medium in the wider sense, or are employed in such media, suitable dispersants of component c) are primarily those which 1) possess at least partial solubility in the media
2) possess a group (so-called anchor group) having a high capacity for adsorption on the preparations of solids containing components a) and b) and optionally
3) additionally contain groups which provide steric stabilization of the preparations of solids in the media.

Generally suitable are nonionic polymeric dispersants having molecular weights of from 1000 to 500,000, such as, for example, homopolymers and copolymers, graft polymers and graft copolymers, and also linear and random block copolymers, especially the AB, BAB and ABC block copolymers mentioned earlier above, and especially block copolymers of ethylene oxide and propylene oxide as are obtainable, for example, under the names Triton®, Pluronic®, Tetronic®, homopolymers and copolymers of vinyl alcohol and/or vinylpyrrolidone, acrylamides, methacrylamides and polymers containing these compounds, the latter especially if the preparations of solids possess acidic anchor groups, carboxylated styrene-butadiene polymers, obtainable for example from anionic polymerization of styrene, butadiene and subsequent reaction with thioglycolic acid, especially in the form of their AB-type block copolymers, monoalkoxy titanates, obtainable for example under the name KenReact® from the company Kenrich, random and linear block copolymers based on optionally styrene and acrylic monomers, especially as disclosed in U.S. Pat. No. 4,339,365, polymers based on a reaction product of one or more polyisocyanates having an average functionality of >2 with at least one monohydroxy compound and optionally a compound containing at least one basic ring nitrogen and an isocyanate-reactive group, as described for example in EP 520 586.

Where component a) of the formulation of the invention comprises an organic or inorganic pigment or carbon black, preferred dispersants of components c) are urethanized homopolymers or copolymers, with particular preference hydroxyl-containing homopolymers or copolymers of vinyl-containing comonomers with compounds containing isocyanate groups or a polyisocyanate addition product containing polyether chains and having an isocyanate group content of not more than 1.0% by weight and containing from 30 to 95% by weight of ethylene oxide units which are arranged within polyether chains and have been incorporated by way of monofunctional alcohols.

Based on the overall preparation, the preparations of solids of the invention contain preferably a) 10–99.9% by weight, preferably 40–99% by weight, of at least one particulate solid of component a)

b) 0.1–90% by weight of the graft copolymer of component b), preferably from 1 to 60% by weight.

The formulations of the invention contain preferably a+b) 0.1–99% by weight of the preparation of solids comprising components a) and b)

c) 0.1–100% by weight of at least one dispersant of component c), based on the sum of components a) and b), and d) 0–99% by weight of water and/or organic medium.

In one preferred embodiment component a) comprises an organic or inorganic pigment, preferably carbon black or metal pigment.

When the preparations of solids or the formulations prepared from them are used in aqueous or aqueous-organic media, component a) comprises a pigment or carbon black having hydrophilic surface properties, which may optionally further contain acidic or alkaline surface groups.

By way of example, for the purposes of the invention, particulate solids may be understood as pigments, especially acidic and alkaline carbon blacks, hydrophilic inorganic pigments and organic pigments, especially those corresponding to the formulae I, II and III, but without restricting the scope of the invention.

In the text below, formulations are understood by way of example to be pigment formulations comprising the above-mentioned pigments as component a).

The invention further provides a process for preparing the formulations of the invention comprising the pigment preparations consisting of components a) and b) and also the dispersant c) and optionally an aqueous and/or organic medium d).

Aqueous formulations are preferably prepared by carrying out homogeneous mixing of pigment preparations comprising components a) and b), prepared by free-radical emulsion polymerization of component b) in the presence of the pigment of component a), optionally in the form of its water-moist presscake, together with at least a portion of the dispersant of component c) and optionally water and/or organic medium of component d), and subsequently subjecting this homogeneous mixture to continuous or batchwise wet comminution.

Suitable wet comminution methods include, for example, dispersion by means of a stirrer or dissolver, grinding by means of stirred ball mills or bead mills, kneading or high-pressure homogenization.

Subsequently, the resulting dispersion is adjusted to the desired pigment formulation, optionally with further water or aqueous-organic medium and, optionally, further necessary portions of component b) and/or c).

In accordance with the invention, the optionally standardized dispersions can also be converted to the dry form by means of an appropriate process.

Suitable drying processes that may be mentioned include the following: spray drying, especially single-fluid spray drying using high-pressure nozzles or swirl chamber nozzles, plate spray drying, spray drying with integrated or downstream fluid-bed agglomeration and/or fluid-bed drying, freeze drying with upstream or downstream granulation, spray-freeze drying, buildup granulation, for example by the plate or drum granulation process, optionally with partially predried product, fluidized-bed drying and granulation, mixer agglomeration and mixer drying, optionally in combination with fluidized-bed or fluid-bed drying, mix-agglomeration in suspension with downstream fluidized-bed or fluid-bed drying, granulation by means of paste-forming with downstream afterdrying and comminution, and steam jet agglomeration.

Combinations of the processes mentioned are likewise possible.

Particular preference is given to the processes of spray drying by means of swirl chamber nozzles, spray drying with integrated or downstream fluidized-bed agglomeration and/or drying, buildup granulation by the plate process, and also fluidized-bed granulation and drying.

If desired, fractions of the other components may also be introduced directly before or during the drying and granulation process.

In accordance with the invention, the aqueous pigment formulations of the invention can also be prepared by carrying out homogeneous mixing of pigment or water-moist press cakes of component a), an aqueous suspension of component b) together with at least a portion of the dispersant of component c) and also optionally water of component d), subjecting this homogeneous mixture to wet comminution and optionally standardizing or drying it as described above.

Pigment formulations of the invention in an organic medium are prepared, for example, by carrying out homogeneous mixing of a preferably water-free pigment preparation comprising components a) and b) in an organic medium of component d), for example an organic solvent, plasticizer and/or polyether polyol or polyester polyol, or polymer together with at least a portion of the dispersant of component c) and, subsequently, optionally subjecting this mixture to dispersion to the desired state of fine division by means of an appropriate apparatus such as, for example, a dissolver, kneading apparatus, roll mill, ball mill, high-speed stirred bead mill or high-pressure homogenizer. Component c) is preferably dissolved in or mixed homogeneously into the organic medium of component d) before the pigment preparation is added.

The pigment formulations of the invention may optionally contain further additives; examples in aqueous formulations that may be mentioned are the following:

surface-active compounds such as, for example, further dispersants, emulsifiers or wetting agents, pH regulators, preservatives and stabilizers, UV stabilizers and also optionally oleophobicizing agents and/or dust-binding agents.

Besides water, particularly preferred organic media of component d) are solvents which are nonvolatile under atmospheric pressure, examples being polyether polyols in the form of their homopolymers, copolymers and block copolymers having a boiling point under atmospheric pressure of more than 150° C., preferably more than 250° C.

The pigment preparations of the invention are notable for very good compatibility with hydrophobic media, especially organic hydrophobic media.

For example, they are outstandingly wettable and readily dispersible in synthetic and natural polymers and relative to the prior art result in better active substance performance, for example high colour intensity and ease of dispersibility in the case of organic and inorganic colour pigments.

Additionally, the pigment preparations possess a high affinity for a large number of dispersants of component c) and are therefore easy to stabilize into the formulations of the invention in water, aqueous-organic medium or organic medium.

The intention of the text below is to elucidate the advantages in more detail with reference to examples.

EXAMPLES

Example 1

Preparing a Pigment Preparation Based on an Organic Colour Pigment of the Formula IX (Ex. 1 from EP-A-839 879)

A 2 l flask with ground-glass joints and jacket heating was charged under nitrogen with 1500 g of a 4.8% strength aqueous suspension of the pigment of the formula IX, prepared in accordance with Example 1 from EP-A-839 879, and at room temperature and a stirrer speed of 250/min 6.4 g of an oxidatively degraded starch (Perfectamyl® A 4692 from Avebe, 86.3% dry matter content) were added and the starch was dissolved in the mixture by heating to 86° C. with stirring.

Subsequently, for the purpose of further degrading the starch, 1.5 g of a 1% strength iron(II) sulphate solution and 4.2 g of $H_2O_2$ (3% strength aqueous solution) were added with stirring, and stirring was continued at 86° C. for 15 minutes. Then, simultaneously, a mixture of 9.8 g of styrene, 4.9 g of n-butyl acrylate and 4.9 g of tert-butylacrylate and 5.7 g of $H_2O_2$ (3% strength aqueous solution) was added continuously at 86° C. over the course of 60 minutes from separate feed vessels. The reaction mixture was then stirred at 86° C. for 15 minutes, 0.5 g of tert-butyl hydroperoxide (85% aqueous) was added and stirring was continued at 86° C. for 60 minutes. After cooling to room temperature with stirring, the suspension was admixed with 1.0 g of 10% strength aqueous EDTA tetrasodium salt solution (Trilon B® solution, BASF) and adjusted to a pH of 5 using glacial acetic acid, and subsequently filtered on a vacuum laboratory suction filter with black-ribbon filter, and the filter cake was dried at 50° C. under vacuum in a drying oven for 72 hours. This gave 94 g of the pigment preparation consisting of 70 g of the pigment of component a) and 24 g of the graft copolymer of component b).

Preparing Aqueous Pigment Formulation Comprising a Pigment of the Formula IX (Ex. 1 from EP-A-839 879)

Example 2

63.3% by weight of water were introduced as initial charge and

5% by weight of polyethylene glycol P 400 and 6.5% by weight of a nonionic dispersant based on phenol/styrene polyglycol ether of formula (X) having an HLB of 17.2 were dissolved homogeneously therein and subsequently 25% by weight of the dried pigment preparation of Example 1 were introduced and the mixture was homogenized.

The suspension was subsequently ground on a 1 1 open laboratory bead mill (manufacturer: Süissmeyer, Brussels) with glass beads of diameter 2 mm for 1 hour with cooling, the pH was adjusted to 7 using dilute sodium hydroxide solution and then the formulation was preserved by adding 0.2% by weight of a preservative (Preventol D2®, Bayer AG) and standardized.

A very good storage-stable pigment formulation was obtained which is very highly compatible in various commercial aqueous white emulsion paints and gives intense, flocculation-stable colorations having excellent colouristic properties.

A pigment formulation prepared analogously but containing 25% by weight of the same powder pigment of the formula IX gives, by comparison, much less intense and flocculation-stable colorations; in particular, rubout was found.

Example 3

As described in Example 2, a pigment formulation was prepared containing

30% by weight of the dried pigment preparation of Example 1

5.4% by weight of a dispersant mixture comprising alkoxylation products of formulae X and XI having a composition corresponding to that in Ex. 4 of EP-A-839 879

64.4% by weight of water and 0.2% by weight of Preventol D2®

This pigment formulation too showed good properties comparable with those of the formulation of Example 2 in commercial white emulsion paints.

In addition, a printing ink was prepared by dilution with the formula below; this printing ink lent itself perfectly to printing on a commercial inkjet printer from Hewlett Packard (HP Deskjet®1600C) using a cleaned black cartridge and on both standard and coated paper gave prints having colour intensity and brilliance. Furthermore, the printing ink was very stable on storage.

| Ink formula (% by weight) | |
|---|---|
| deionized water | 77.1% by weight |
| polyethylene glycol (molar weight 400 g/mol) | 4.0% by weight |
| 2-pyrrolidone | 3.9% by weight |
| isopropanol | 1.5% by weight |
| pigment formulation of Example 3 | 13.3% by weight |
| preservative (Preventol D2 ®) | 0.2% by weight |
| pH | 7.5 |

Example 4

Preparing a Pigment Preparation Based on a Carbon Black

Following the procedure of Example 1 but using 1500 g of an aqueous carbon black dispersion, pH 2.5, containing 5% by weight of an acidic gas black having a specific surface area of 96 $m^2$ and 0.48% by weight of a naphthalenesulphonic acid condensation product (Tamol®NA7519, BASF) dispersed continuously beforehand by two passes through a high-pressure homogenizer (AVP Homogeniser GmbH, Lübeck) at 1000 bar gave, after drying, 98 g of a black pigment preparation.

Example 5

Following the same procedure as in Example 2 but using zirconium dioxide beads having a diameter of 0.7 mm as grinding medium and a milling duration of 2 hours, a black pigment formulation was prepared containing:

35% by weight of the pigment preparation from Example 4

6.2% by weight of the same naphthalenesulphonic acid condensation product as in Example 4

8.0% by weight of tripropylene glycol 0.2% by weight of 1,2-benzisothiazol-3-(2H)-one (Proxel® GXL 20% from Zeneca)

0.1% by weight of Preventol D2® (isothiazolidone mixture)

50.5% by weight of water.

The pigment formulation obtained in this way possesses very good flow properties and storage stability which make it likewise outstandingly suitable for the preparation of inks for inkjet printing. Furthermore, it was particularly suitable for the low-foam mass colouring of paper and gave intense colorations having very good fastness properties (acid, alkali and solvent fastness).

Example 6

Using a black pigment preparation prepared in accordance with Example 4, discontinuous grinding as described in Example 2 was used to prepare an organic (water-free) pigment formulation containing:

32% by weight of the pigment preparation from Example 4

63.7% by weight of diethylene glycol monobutyl ether 4.5% by weight of a polyisocyanate adduct according to Example 1, EP-A 829 496

The pigment formulation obtained in this way possessed excellent stability with very good flow properties and, when used in a polyester urethane foam material gave a much higher colour strength for comparable carbon black content than a prior art colour paste based on the same carbon black.

Example 7

A pigment preparation prepared in accordance with Example 1 was beaten in water in accordance with the formula below, then ground continuously on a horizontal stirred bead mill (201 volume) with glass beads of 1 mm diameter, 70% by volume bead filling level, throughput 60 kg/h, in one pass at a pH of 6.8.

25% by weight of the pigment preparation from Example 1

75% by weight of a 1.66% strength aqueous solution of the Na salt of bis-(2-ethylhexyl) sulphosuccinate The low-viscosity pigment slurry obtained in this way was subsequently dried by granule spray drying to a residual moisture content of 0.4% by weight, giving the desired pigment formulation.

When tested in thermoplastics such as PVC, PB, PE, this formulation was much more readily dispersible and stronger in colour in comparison with the colour-equivalent coloration using the crude pigment according to formula IX (Ex. 1 from EP-A-839 879).

Example 8

In a 2 l flask with ground-glass joints and jacket heating, stirrer and reflux condenser, 124.5 g of an oxidatively degraded starch (Perfectamyl® A 4692 from Avebe) with a dry matter content of 86.3% were dispersed in 1025 g of deionized water under nitrogen at a stirrer speed of 300 rpm and at room temperature and were dissolved by heating to 86° C. Then, in succession, 23.2 g of a 1% strength iron(II) sulphate solution and 116.1 g of a 3.3% strength hydrogen peroxide solution were added and the solution was stirred at 86° C. for 15 minutes. Then, simultaneously but separately, is the two solutions below were metered in at a constant rate over the course of 90 minutes at 86° C.:

1) mixture of 192.8 g of styrene, 115.4 g of n-butyl acrylate and 13.0 g of acrylic acid 2) 93.7 g of a 3% strength hydrogen peroxide solution After the end of the two feeds, stirring was continued at 86° C. for 15 minutes and then 1.2 g of tert-butyl hydroperoxide (85% strength aqueous solution) were added for reactivation. After a further 60 minutes at 86° C., the batch was cooled to room temperature and filtered through a 100 $\mu$m nylon filter cloth. The pH of the dispersion was adjusted to 6.5 using concentrated aqueous ammonia solution. For preservation, finally, 0.5 g of Preventol® D7 (Bayer AG) was added to the dispersion. This gave a finely divided dispersion having a solids content of 24.7%.

Example 9

Pigment preparation of an inorganic colour pigment.

A dissolver was charged with 14.6 parts by weight of water, 0.2 parts by weight of 1.2-benzisothiazol-3-(2H)-one (20% strength) and 20.2 parts by weight of a 24.7% strength aqueous dispersion of the graft copolymer of Example 8 and these components were mixed homogeneously; subsequently 65 parts by weight of a red iron oxide pigment (Bayferrox® Red 130 M, Bayer AG) were added and the suspension was homogenized with cooling at a stirrer tip speed of 16 m/s, after which the pH was adjusted to 8.5 using dilute sodium hydroxide solution. Addition and homogenization of a further 10.9 parts by weight of polyethylene glycol, molar weight 400 g/mol, and 0.5 parts by weight of an inorganic thickener (Aerosil 380®)

gave a readily flowable, storage-stable pigment formulation which was outstandingly suitable for pigmenting aqueous paper coating slips and emulsion paints.

Example 10

Following the procedure of Example 9 but adding 6.0 parts by weight of polyethylene glycol P 400 instead of 10.9 parts by weight, without adding a thickener, and then diluting with a further 12.0 parts by weight of water and subsequently carrying out granule spray drying to a residual moisture content of <1.0% by weight gave a non-dusting, very readily free-flowing pigment formulation which was incorporated into aqueous emulsion paints and coating systems with a much lower shear energy than the powder pigment used and led to intense colorations without flocculation (no rubout).

What is claimed is:

1. A composition comprising a) at least one particulate solid and b) a water-dispersible graft copolymer built up from at least one hydrophobic, ethylenically unsaturated monomer, optionally one or more ethylenically unsaturated hydrophilic monomers, and at least one natural protective colloid or protective colloid obtained from a natural protective colloid by derivatization or thermal, enzymatic, oxidative, hydrolytic or bacteriological degradation having an average molar mass of $M_n$>500 g/mol.

2. The composition of claim 1, characterized in that the particulate solids of component a) are organic or inorganic pigments, carbon blacks, metal pigments, extender pigments or water-insoluble or sparingly soluble dyes or optical brighteners.

3. The composition of claim 1, characterized in that the particulate solids of component a) comprise organic colour pigments of the general (tautomeric) structure I, II and/or III, and also their salts, complexes, inclusion compounds, solid solutions or intercalation compounds (I)

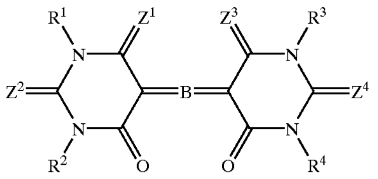

(II)

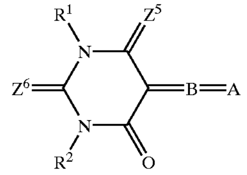

(III)

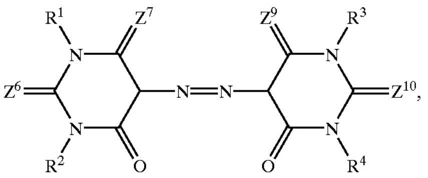

in which $R^1$, $R^2$, $R^3$ and $R^4$ independently of one another represent hydrogen, alkyl, especially $C_1$–$C_6$-alkyl, cycloalkyl, especially $C_5$–$C_8$-cycloalkyl, aryl, especially optionally substituted phenyl, aralkyl, especially $C_6$–$C_{10}$-aryl-$C_1$–$C_4$-alkyl, such as benzyl or ethyl-phenyl, or hetaryl, B denotes the radical of an isoindoline of the formula

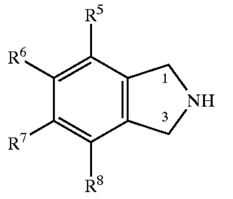

where the linkage with the two double bonds takes place in positions 1 and 3 of the isoindolenine, and $R^5$, $R^6$, $R^7$ and $R^8$ independently of one another represent hydrogen, halogen, especially F, Cl and Br, $C_1$–$C_6$-alkyl, $C_1$–$C_6$-alkoxy or $C_6$–$C_{10}$-aryloxy, A denotes the radical of a cyanomethylene of the formula

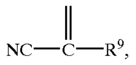

in which $R^9$ represents an electron-withdrawing radical and $Z^1$ to $Z^{10}$ independently of one another represent O or $NR^{10}$, in which $R^{10}$ represents hydrogen or cyano.

4. The composition of claim 1, characterized in that the solid of component a) corresponds to pigments of the formula (III) of the formula (VIII) or (IX)

(VIII)

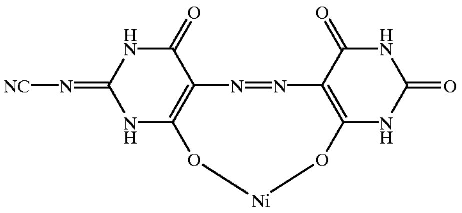

(IX)

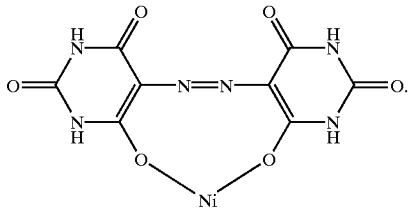

5. The composition of claim 3, characterized in that the pigment of the formula (III) is present in the form of an inclusion compound or intercalation compound, the included compound being a cyclic or acyclic compound, preferably carboxamides or sulphonamides, urea or substituted ureas, and heterocycles, especially 2,4,6-triamino-1,3,5-triazine, acetoguanamine and benzoguanamine.

6. A composition comprising a) at least one particulate solid, b) a water-dispersible graft copolymer build up from at least one hydrophobic, ethylenically unsaturated monomer, optionally one or more ethylenically unsaturated hydrophilic monomers, and at least one natural protective colloid or protective colloid obtained from a natural protective colloid by derivatization or thermal, enzymatic, oxidative, hydrolytic or bacteriological degradation having an average molar mass of $M_n$>500 g/mol, c) at least one dispersant and d) optionally water and/or an organic medium.

7. The composition of claim 6, characterized in that the dispersant of component c) is a compound from the group of the optionally ionically modified phenol-styrene polyglycol ethers.

8. The composition of claim 6, characterized in that the dispersant of component c) is a condensation product based on A) sulphonated aromatics, B) aldehydes and/or ketones and optionally C) one or more compounds selected from the group of unsulphonated aromatics, urea and urea derivatives.

9. The composition of claim 6, characterized in that the dispersant of component c) is a condensation product based on A) at least one sulphonated aromatic selected from the group of naphthalenesulphonic acids, phenolsulphonic acids, dihydroxy-benzenesulphonic acids, sulphonated ditolyl ethers, sulphomethylated 4,4'-dihydroxydiphenyl sulphone, sulphonated diphenylmethane, sulphonated biphenyl, sulphonated hydroxybiphenyl, especially 2-hydroxybiphenyl, sulphonated terphenyl and benzenesulphonic acids, B) formaldehyde and optionally C) one or more compounds selected from the group of phenol, cresol, 4,4'-dihydroxydiphenyl sulphone, dihydroxydiphenyl methane, urea, dimethylolurea, melamine and guanidine.

10. The compositions of claim 8, characterized in that the condensation products have an inorganic salt content of <10% by weight, preferably <5% by weight, in particular <1% by weight, an average degree of condensation of from 1 to 150, preferably from 1 to 20, in particular from 1 to 5, and a residual monomer content of less than 30% by weight, preferably less than 10% by weight, in particular less than 5% by weight.

11. The compositions of claim 6, characterized in that the dispersant of component c) is a compound of the formula (XIII) to (XV)

(XIII)

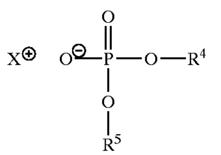

or (XIV)

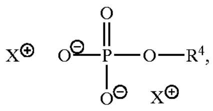

where $R^4$ and $R^5$ independently denote an organic radical having 1–20 carbon atoms and $X^{\oplus}$ represents H, or a monovalent cation, (XV)

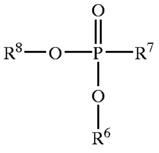

in which $R^6$ represents H, or an organic radical having 1–20 carbon atoms, $R^7$ denotes $C_{11}$–$C_{22}$-alkyl or cycloalkyl, $C_7$–$C_{18}$-aralkyl, or a radical of the general formula $-R^9-O-CO-R^{10}$ or $-R^9-COO-R^{10}$, where $R^9$ denotes an optionally substituted $C_2$–$C_4$-alkylene radical, and $R^{10}$ denotes a $C_6$–$C_{22}$-alkyl, cycloalkyl or alkylene radical;

in particular, $R^7$ may be a radical of $C_4$–$C_7$-dicarboxylic or tricarboxylic acid or derivatives thereof (e.g. esters), for example the radical of butane-1,2,4-tricarboxylic acid, ethanedicarboxylic acid or derivatives thereof, $R^8$ represents H or $CH_3$.

12. The composition of claim 6, characterized in that the dispersant of component c) is a compound from the group of the oxalkylation products obtainable by condensing aromatics containing phenolic OH groups with formaldehyde and NH-functional groups, preferably compounds obtained by oxalkylating compounds of the formula (XVI)

(XVI)

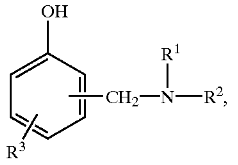

in which $R^1$ denotes the monovalent radical of an optionally substituted aliphatic, cycloaliphatic or aromatic hydrocarbon, $R^2$ denotes hydrogen or the monovalent radical of an optionally substituted aliphatic, cycloaliphatic or aromatic hydrocarbon and $R^3$ denotes hydrogen, $C_1$–$C_{20}$-alkyl, $C_5$–$C_7$-cycloalkyl, phenyl, benzyl, halogen, hydroxyl, $C_1$–$C_{18}$-alkoxy, carboxyl or $C_1$–$C_{18}$-alkoxycarbonyl, the oxalkylation reagents used being preferably ethylene oxide, propylene oxide, butylene oxide, styrene oxide, glycide or mixtures of these compounds, but especially ethylene oxide, optionally together with propylene oxide.

13. The composition of claim 6, characterized in that the dispersant of component c) is a compound selected from the group of water-soluble polyisocyanate adducts containing hydrophilic polyether chains containing preferably not more than 1.0% by weight of isocyanate groups, 30–99.5% by weight of ethylene oxide units arranged within polyether chains and incorporated by way of monofunctional alcohols, and having an ionic group content of 0–200 milliequivalents/100 g of polyisocyanate adducts.

14. The composition of claim 6, characterized in that the dispersant of component c) is a compound selected from the group of polymeric dispersants, preferably homopolymers and copolymers, graft polymers and graft copolymers and linear and random block copolymers having a molecular weight of 1000–100,000 g/mol, preferably 2000–40,000 g/mol, in particular 5000–30,000 g/mol.

15. The composition of claim 1, comprising a) 10–99.9% by weight, preferably 40–99% by weight, of at least one particulate solid of component a)

b) 0.1–90% by weight of the graft copolymer of component b), preferably from 1 to 60% by weight.

16. Process for preparing the composition of claim 1, characterized in that components a) and b) are mixed in water and the mixture of a) and b) is optionally separated off.

17. Process for preparing the composition of claim 1, characterized in that the structural components of b) are reacted with one another by emulsion polymerization in the presence of component a) and the mixture of a) and b) thus prepared is optionally isolated.

18. The composition of claim 6 containing a+b) 0.1–99% by weight of the preparation of solids comprising components a) and b), c) 0.1–100% by weight of at least one dispersant of component c), based on the sum of components a) and b), and d) 0–99% by weight of water and/or organic medium.

19. A natural or synthetic material pigmented with the composition of claim 1.

20. A natural or synthetic material pigmented with the composition of claim 6.

* * * * *